(12) United States Patent  (10) Patent No.: US 9,141,541 B2
Kalyanasundharam et al.  (45) Date of Patent: Sep. 22, 2015

(54) NESTED CHANNEL ADDRESS INTERLEAVING

(71) Applicant: Advanced Micro Devices, Inc., Sunnyvale, CA (US)

(72) Inventors: Vydhyanathan Kalyanasundharam, San Jose, CA (US); Kevin M. Brandl, Austin, TX (US); Adnan Dhanani, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 14/032,887

(22) Filed: Sep. 20, 2013

(65) Prior Publication Data

US 2015/0089168 A1  Mar. 26, 2015

(51) Int. Cl.
*G06F 3/00* (2006.01)
*G06F 12/06* (2006.01)

(52) U.S. Cl.
CPC .................................. *G06F 12/0607* (2013.01)

(58) Field of Classification Search
CPC ................................................... G06F 12/0607
See application file for complete search history.

(56) References Cited

U.S. PATENT DOCUMENTS

| | | | |
|---|---|---|---|
| 5,272,664 A | 12/1993 | Alexander et al. | |
| 5,434,861 A | 7/1995 | Pritty et al. | |
| 5,504,700 A | 4/1996 | Insley et al. | |
| 5,983,323 A | 11/1999 | Billard et al. | |
| 6,034,878 A | 3/2000 | Osaka et al. | |
| 6,215,727 B1 | 4/2001 | Parson et al. | |
| 6,249,840 B1 | 6/2001 | Peters | |
| 6,321,282 B1 | 11/2001 | Horowitz et al. | |
| 6,377,640 B2 | 4/2002 | Trans | |
| 6,381,668 B1 * | 4/2002 | Lunteren | 711/5 |
| 6,480,946 B1 | 11/2002 | Tomishima et al. | |
| 6,502,161 B1 | 12/2002 | Perego et al. | |
| 6,516,282 B2 | 2/2003 | Hedlund et al. | |
| 6,553,446 B1 | 4/2003 | Miller | |
| 6,640,309 B2 | 10/2003 | Doblar et al. | |
| 6,781,911 B2 | 8/2004 | Riesenman et al. | |

(Continued)

FOREIGN PATENT DOCUMENTS

| | | |
|---|---|---|
| DE | 112004000821 T5 | 5/2006 |
| JP | 2001331439 | 11/2001 |
| WO | 2006083899 A1 | 8/2006 |

OTHER PUBLICATIONS

Translation of Official Communication in German Application No. 112007002605.7, issued Jun. 10, 2010.

(Continued)

*Primary Examiner* — Jing-Yih Shyu
(74) *Attorney, Agent, or Firm* — Rory D. Rankin; Meyertons, Hood, Kivlin, Kowert & Goetzel, P.C.

(57) ABSTRACT

A system and method for mapping an address space to a non-power-of-two number of memory channels. Addresses are translated and interleaved to the memory channels such that each memory channel has an equal amount of mapped address space. The address space is partitioned into two regions, and a first translation function is used for memory requests targeting the first region and a second translation function is used for memory requests targeting the second region. The first translation function is based on a first set of address bits and the second translation function is based on a second set of address bits.

16 Claims, 9 Drawing Sheets

(56) References Cited

U.S. PATENT DOCUMENTS

| | | |
|---|---|---|
| 6,839,393 B1 | 1/2005 | Sidiropoulos |
| 6,954,871 B2 | 10/2005 | Kuhn |
| 7,003,684 B2 | 2/2006 | Chang |
| 7,016,213 B2 | 3/2006 | Reeves et al. |
| 7,165,153 B2 | 1/2007 | Vogt |
| 7,222,224 B2 | 5/2007 | Woo et al. |
| 7,286,134 B1* | 10/2007 | Van Dyke et al. ............ 345/544 |
| 7,313,639 B2 | 12/2007 | Perego et al. |
| 7,620,793 B1* | 11/2009 | Edmondson et al. ......... 711/208 |
| 7,884,829 B1* | 2/2011 | Van Dyke et al. ............ 345/544 |
| 7,932,912 B1* | 4/2011 | Van Dyke .................... 345/544 |
| 8,072,463 B1* | 12/2011 | Van Dyke et al. ............ 345/568 |
| 2003/0070052 A1 | 4/2003 | Lai |
| 2003/0179777 A1 | 9/2003 | Denton et al. |
| 2003/0200407 A1 | 10/2003 | Osaka et al. |
| 2003/0231543 A1 | 12/2003 | Matsui |
| 2004/0024978 A1 | 2/2004 | Jeddeloh |
| 2004/0098545 A1 | 5/2004 | Pline et al. |
| 2004/0230718 A1 | 11/2004 | Polzin et al. |
| 2004/0236877 A1 | 11/2004 | Burton |
| 2005/0021884 A1 | 1/2005 | Jeddeloh |
| 2005/0166006 A1 | 7/2005 | Talbot et al. |
| 2005/0210216 A1 | 9/2005 | Jobs et al. |
| 2005/0259672 A1* | 11/2005 | Eduri ........................... 370/412 |
| 2005/0276261 A1 | 12/2005 | Kim et al. |
| 2006/0034358 A1 | 2/2006 | Okamura |
| 2007/0038831 A1 | 2/2007 | Kim et al. |
| 2007/0109019 A1 | 5/2007 | Wu et al. |
| 2007/0121389 A1 | 5/2007 | Wu et al. |
| 2007/0162670 A1 | 7/2007 | Yang et al. |
| 2008/0104352 A1 | 5/2008 | Talbot |
| 2011/0078359 A1* | 3/2011 | Van Dyke ....................... 711/5 |

OTHER PUBLICATIONS

Office Action from Japanese Patent Application No. 2009-535285, mailed Aug. 29, 2012, 4 pages.

Office Action from Japanese Patent Application No. 2009-535285, mailed Feb. 27, 2013, 4 pages.

* cited by examiner

| System Address | Range | Mod Offset Region | Channel Select | Channel Address |
|---|---|---|---|---|
| 0 | P | 0 | 0 | 0 |
| 64 | P | 0 | 1 | 0 |
| 128 | P | 0 | 2 | 0 |
| 192 | P | 1 | 0 | 128 |
| 256 | P | 1 | 1 | 128 |
| 320 | P | 1 | 2 | 128 |
| 384 | P | 2 | 0 | 256 |
| 448 | P | 2 | 1 | 256 |
| 512 | P | 2 | 2 | 256 |
| 576 | P | 3 | 0 | 384 |
| 640 | P | 3 | 1 | 384 |
| 704 | P | 3 | 2 | 384 |
| 768 | P | 4 | 0 | 512 |
| 832 | P | 4 | 1 | 512 |
| 896 | P | 4 | 2 | 512 |
| 960 | P | 5 | 0 | 640 |
| 1024 | P | 0 | 0 | 64 |
| 1088 | P | 0 | 1 | 64 |
| 1152 | P | 0 | 2 | 64 |
| 1216 | P | 1 | 0 | 192 |
| 1280 | P | 1 | 1 | 192 |
| 1344 | P | 1 | 2 | 192 |
| 1408 | P | 2 | 0 | 320 |
| 1472 | P | 2 | 1 | 320 |
| 1536 | P | 2 | 2 | 320 |
| 1600 | P | 3 | 0 | 448 |
| 1664 | P | 3 | 1 | 448 |
| 1728 | P | 3 | 2 | 448 |
| 1792 | P | 4 | 0 | 576 |
| 1856 | P | 4 | 1 | 576 |
| 1920 | P | 4 | 2 | 576 |
| 1984 | P | 5 | 0 | 704 |
| 2048 | S | 5 | 1 | 640 |
| 2112 | S | 5 | 2 | 640 |
| 2176 | S | 6 | 0 | 768 |
| 2240 | S | 6 | 1 | 768 |
| 2304 | S | 6 | 2 | 768 |
| 2368 | S | 7 | 0 | 896 |
| 2432 | S | 7 | 1 | 896 |
| 2496 | S | 7 | 2 | 896 |
| 2560 | S | 5 | 1 | 704 |
| 2624 | S | 5 | 2 | 704 |
| 2688 | S | 6 | 0 | 832 |
| 2752 | S | 6 | 1 | 832 |
| 2816 | S | 6 | 2 | 832 |
| 2880 | S | 7 | 0 | 960 |
| 2944 | S | 7 | 1 | 960 |
| 3008 | S | 7 | 2 | 960 |

NESTED CHANNEL ADDRESS INTERLEAVING

BACKGROUND OF THE INVENTION

1. Field of the Invention

This invention relates to computing systems, and more particularly, to interleaving memory requests across memory channels.

2. Description of the Relevant Art

A computing system may issue memory requests through an interface to any of a plurality of memory channels. In some embodiments, addresses are interleaved among the memory channels to improve bandwidth utilization. Typically, a system address is interleaved by mapping the system address through a single range register and using modulo N arithmetic. Normally, interleaving is done across a power-of-two (i.e., $2^n$) number of channels. As an example, when memory is interleaved across four channels, any two address bits may be used to distribute the address space. The address bits used for interleaving are then dropped before the request is sent to a respective memory controller.

The techniques currently used to interleave an address space across non-power-of-two numbers of channels have a variety of shortcomings. For example, for a system with three memory channels, a common technique involves picking three address bits and distributing these address bits using mod 3 arithmetic. However, this will end up with two of the memory channels receiving three addresses and one memory channel receiving two. Therefore, there is a desire to support interleaving across memory channels including three channels or across other non-power-of-two numbers of channels.

SUMMARY OF EMBODIMENTS OF THE INVENTION

Systems and methods for using a nested interleaving scheme to map an address space to memory channels are contemplated.

In one embodiment, a system address space is translated such that system addresses are interleaved across N numbers of memory channels, where N may be a non-power-of-two number. In various embodiments, the overall address range is split into two or more regions and interleaved on a region-by-region basis. In at least some embodiments, the memory channels include memory devices, and each of the memory devices are the same size.

In one embodiment, the system address space is interleaved across three memory channels. In this embodiment, the address range is split into two regions with the first region corresponding to two-thirds of the total address space and the second region corresponding to one-third of the total address space. The first region applies a first translation function to the address of a given memory request based on 4 address bits while the second region applies a second translation function based on 3 address bits of the address. By using the first and second translation functions, system addresses are interleaved across the memory channels without creating an imbalance or unused regions of the available memory. Through the use of this and other nested interleaving schemes described herein, memory bandwidth may be increased as accesses are serviced evenly across available memory.

These and other embodiments will be further appreciated upon reference to the following description and drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

It will be appreciated that for simplicity and clarity of illustration, elements shown in the figures have not necessarily been drawn to scale. For example, the dimensions of some of the elements may be exaggerated relative to other elements.

Terminology. The following paragraphs provide definitions and/or context for terms found in this disclosure (including the appended claims):

In the detailed description that follows, references to "one embodiment," "an embodiment," "an example embodiment," etc., indicate that the embodiment described may include a particular feature, structure, or characteristic. However, it is to be understood that not every embodiment necessarily includes the particular feature, structure, mode of operation, or characteristic. Moreover, such phrases are not necessarily referring to the same embodiment. Alternate embodiments may be devised without departing from the scope of the disclosure, and well-known elements of the disclosure may not be described in detail or may be omitted so as not to obscure the relevant details. Further, when a particular feature, structure, or characteristic is described in connection with an embodiment, it is submitted that it is within the knowledge of one skilled in the art to affect such feature, structure, or characteristic in connection with other embodiments whether or not explicitly described. In addition, the description may refer to particular embodiments as having particular characteristics or performing particular actions using terms such as "does", "is", "uses", "utilizes", or otherwise. However, it is to be understood that various embodiments may not have the described characteristics or perform the described actions. Rather, Alternate embodiments may be devised without departing from the scope of the disclosure as noted above.

In addition to the above, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to. As used in the appended claims, these terms do not foreclose additional structure or steps. Consider a claim that recites: "A computing system comprising one or more processor cores . . . " Such a claim does not foreclose the computing system from including additional components (e.g., a GPU, one or more memory devices).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
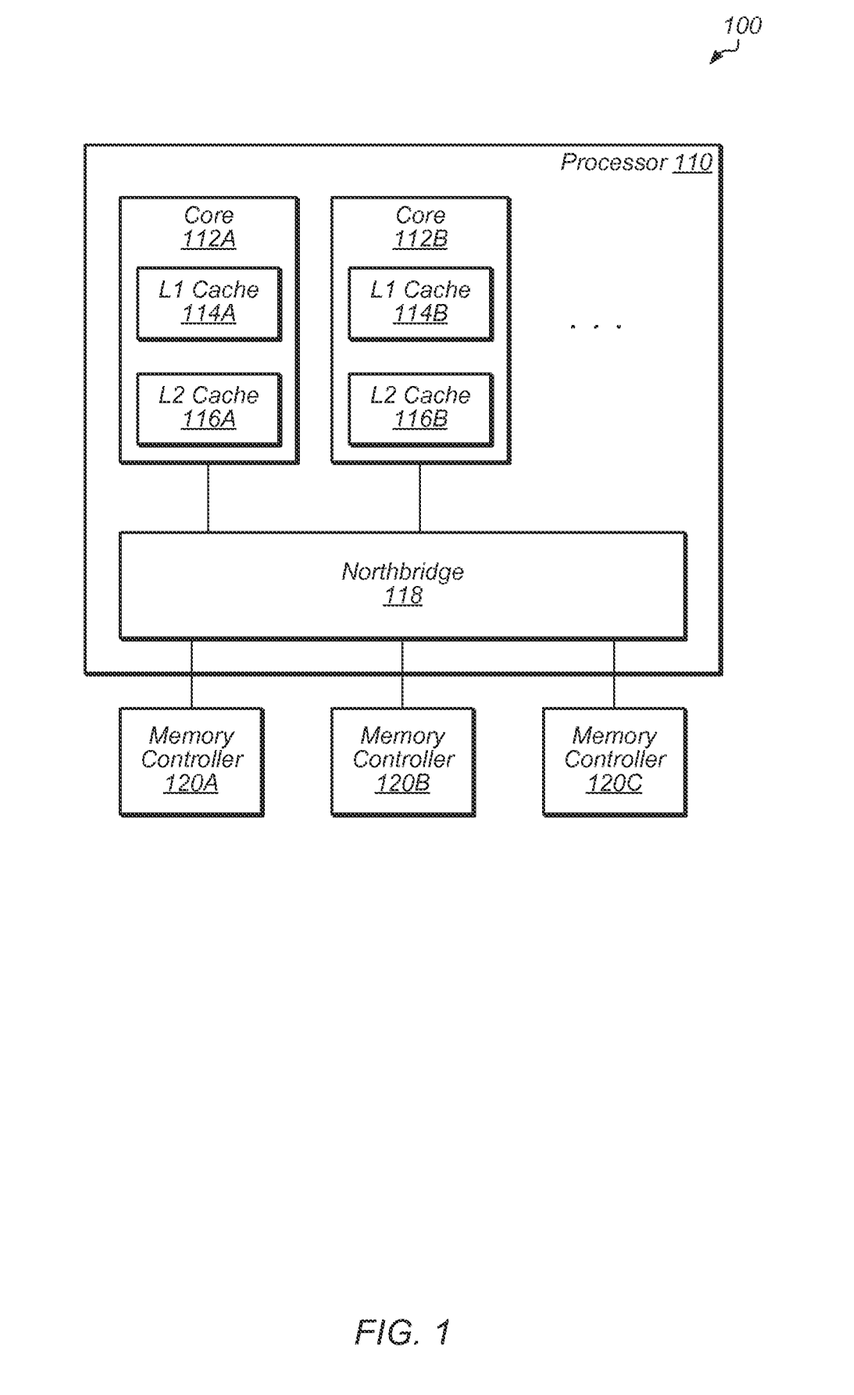
FIG. 1 is a generalized block diagram of one embodiment of a computing system.

Referring to FIG. 1, a block diagram of one embodiment of a computer system 100 including a processor is shown. In the example shown, processor 110 includes one or more processor cores, (e.g., processor cores 112A-B), and each processor core 112A-B is configured to execute instructions stored in a system memory (not shown). Such instructions may be defined according to a particular instruction set architecture (ISA). For example, processor cores 112A-B may be configured to implement a version of the x86 ISA, although in other embodiments cores 112A-B may implement a different ISA or a combination of ISAs. Each core 112A-B may issue memory requests to memory via northbridge 118 and a corresponding memory controller 120A-C.

In one embodiment, the illustrated functionality of processor 110 is incorporated in a single integrated circuit. Generally, each processor core 112A-B accesses the cache memory subsystems, including at least L1 caches 114A-B and L2 caches 116A-B, respectively, for data and instructions. If the requested block is not found in the cache memory subsystem, then a read request is generated and transmitted to memory via northbridge 118 and a corresponding memory controller 120A-C. Cores 112A and 112B may be the same or different types of cores (e.g., CPU cores, GPU cores, DSP cores, etc.).

Memory controllers 120A-C are configured to interface processor 110 with the system memory. For example, memory controllers 120A-C are configured to generate the signals necessary to support one or more different types of random access memory (RAM). The system memory is configured to store instructions and data that is operated on by the various cores 112A-B of processor 110, and the contents of the system memory are cached by various ones of the caches described above. In one embodiment, the cache memory subsystems are integrated within respective processor cores 112A-B. Alternatively, the cache memory subsystems may be coupled to processor cores 112A-B in a backside cache configuration or an inline configuration, as desired.

Each memory controller 120A-C is coupled to a corresponding memory device (not shown). Each memory controller 120A-C and corresponding memory device may be referred to as a memory channel. In one embodiment, the memory devices are double-data-rate-two or double-data-rate-three synchronous dynamic random access memory (i.e., DDR2/3 DRAM). In other embodiments, other suitable memory structures may be utilized. Additionally, in some embodiments, a secondary bus bridge (e.g., a "south bridge") external to processor 110 may be used to couple processor 110 to other peripheral devices via other types of buses or interconnects.

It is noted that processor 110 may include other components (e.g., GPU) and interfaces not shown in FIG. 1 to avoid cluttering the figure. It is also noted that processor 110 may be structured differently in other embodiments. It is further noted that other embodiments may include other combinations of components, including subsets or supersets of the components shown in FIG. 1 and/or other components. While one instance of a given component may be shown in FIG. 1, other embodiments may include two or more instances of the given component.

Figure 2:
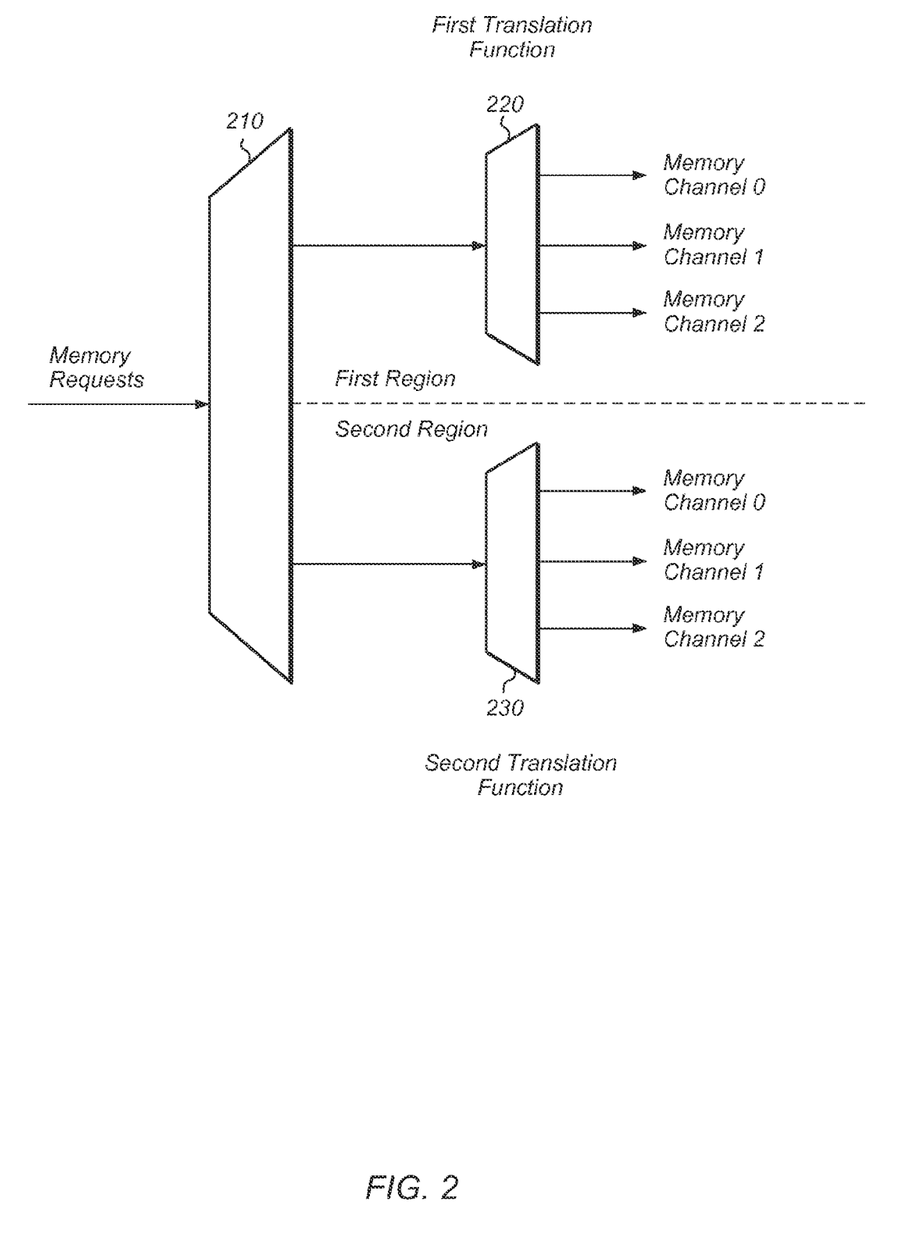
FIG. 2 is a generalized block diagram of one embodiment of interleaving addresses among three memory channels.

Turning now to FIG. 2, a block diagram of one embodiment of interleaving addresses among three memory channels is shown. The logic shown in FIG. 2 is utilized to evenly map the entirety of a system address space to each of three memory channels. It is noted that the block diagram in FIG. 2 is merely a logical representation of a three channel address interleaving scheme, and the actual physical representation of hardware and/or software utilized to implement the scheme may vary according to the embodiment.

Memory requests are routed, distributed, and/or mapped by demux 210 on two different paths based on their address. Demuxes 210, 220 and 230 are representative of any type and combination of hardware and/or software which is used to partition an address space into multiple regions and distribute memory requests to the appropriate region based on their addresses. In the embodiment shown in FIG. 2, the system address space is logically partitioned into two regions. However, in other embodiments, the system address space may be partitioned into a different number of regions.

In the embodiment shown in FIG. 2, the system includes three memory channels. However, other embodiments may have other numbers of memory channels. Demux 220 utilizes a first translation function to translate and interleave addresses from memory requests to the three memory channels. The first translation function utilizes a first number of address bits to determine which memory channel is addressed by a given memory request. Similarly, demux 230 utilizes a second translation function to translate and interleave addresses from memory requests to the three memory channels. The second translation function utilizes a second number of address bits to determine which memory channel is addressed by a given memory request. The second number of address bits may be different than the first number of address bits. For example, in one embodiment, the first region is one third of the total address space and the first number is three while the second region is two thirds of the total address space and the second number is four. In other embodiments, the sizes of the first and second regions and the first and second numbers may vary.

Figure 3:
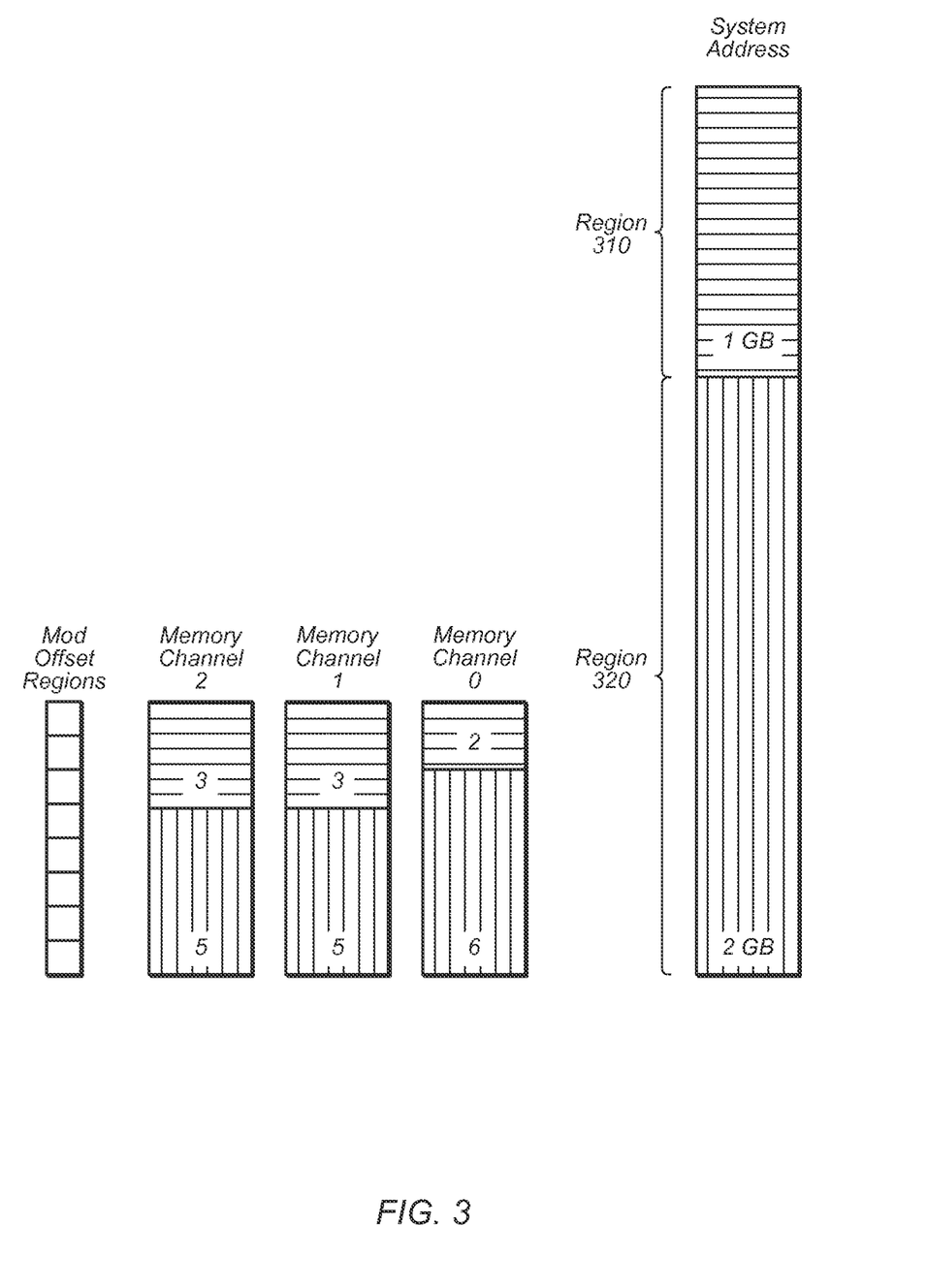
FIG. 3 is a generalized block diagram of one embodiment of partitioning an address space.

Referring now to FIG. 3, one embodiment of partitioning an address space is shown. In the example shown in FIG. 3, three gigabytes (GB) of address space is being partitioned across three memory channels. In the example shown, each memory channel is equal-sized and has 1 GB of storage capacity. The 2-GB region 320 of the address space is distributed using four bits, while the 1-GB region 310 of the address space is distributed using three bits.

As shown for the 2-GB region 320, the address space is distributed using 4 bits. The 4 bits are broken down into 16 separate address blocks, and memory channels 1-2 may get 5 address blocks and memory channel 0 may get 6 address blocks. For the 1-GB region 310, the address space is distributed using 3 bits. The 3 bits separate the address space into 8 separate address blocks, and memory channels 1-2 may get 3 address blocks and memory channel 0 may get 2 address blocks. Therefore, when considering the entire 3-GB address space, each channel will be assigned 8 address blocks across the two separate regions. In this way, the address space will be mapped into equal portions to each of the channels. When a memory request is sent to the corresponding memory channel, a modulo offset is added to the translated address to prevent aliasing of the various addresses which are mapped to each memory channel. For example, a modulo offset of "000" may be concatenated with the translated address for a first modulo offset region, a modulo offset of "001" may be concatenated with the translated address for a second modulo offset region, and so on for the eight modulo offset regions shown on the left side of FIG. 3.

It is noted that the example shown in FIG. 3 is merely one embodiment of an implementation of nested interleaving for a non-power-of-two number of channels. In other embodiments, other sizes of address spaces and other numbers of channels may utilize a similar nested interleaving scheme. For example, the interleaving schemes described herein may be employed with any non-power-of-two number of memory channels. A power-of-two number is defined as a number of the form $2^n$, wherein n is a positive integer. Therefore, a non-power-of-two number may be defined as any positive integer (excluding one) that is not a power-of-two number.

Figure 4:
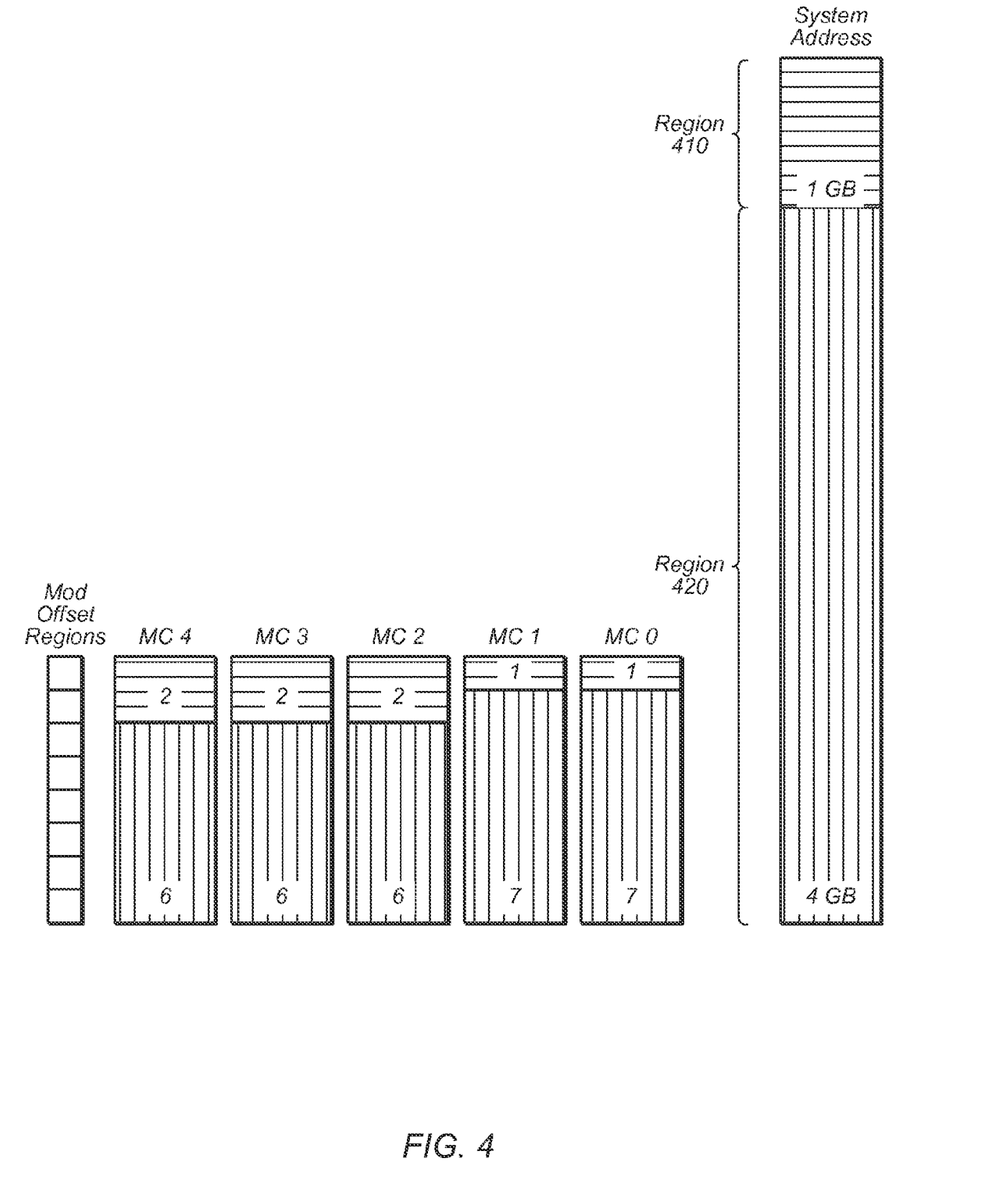
FIG. 4 is a generalized block diagram of another embodiment of partitioning an address space.

Referring now to FIG. 4, another embodiment of partitioning an address space is shown. In the example shown in FIG. 4, five GB of address space is being partitioned across five memory channels. In one embodiment, the address space is partitioned into two regions, with region 420 of size four GB and the region 410 of size one GB. The 4-GB region 420 is mapped using 5 address bits, and the separate memory channels are assigned 6, 6, 6, 7, and 7 address blocks, respectively. The 1-GB region 410 is mapped using 3 address bits, and the separate memory channels are assigned 2, 2, 2, 1, and 1 address blocks, respectively. In this way, each memory channel will have 8 separate address blocks. Therefore, each memory channel will be assigned 1 GB of address space out of the total of 5 GB of total address space. When a memory request is sent to the corresponding memory channel, a modulo offset is added to the translated address to prevent aliasing of the various addresses which are mapped to each memory channel. For example, a first modulo offset of "000" is concatenated with the translated address for a first modulo offset region, a second modulo offset of "001" is concatenated with the translated address for a second modulo offset region, and so on for the eight modulo offset regions shown on the left side of FIG. 4.

It is noted that other embodiments may have other numbers of memory channels and other amounts of address space. When the number of channels is a non-power-of-two number, then a nested interleaving scheme similar to those shown in FIGS. 3 and 4 may be utilized and optimized for the particular arrangement of the host system.

For example, in another embodiment, a computing system is includes seven memory channels. In this embodiment, the address space is partitioned into three separate regions. For the first region, 4/7 of the address space is interleaved to the seven memory channels using 5 address bits. In the second region, 2/7 of the address space is interleaved to the seven memory channels using 4 address bits. In the third region, 1/7 of the address space is interleaved using 3 address bits. Therefore, the memory channels are assigned 4, 4, 4, 5, 5, 5, and 5 blocks, respectively, from the first region. The memory channels may also be assigned 3, 3, 2, 2, 2, 2, and 2 blocks, respectively, from the second region and may be assigned 1, 1, 2, 1, 1, 1, and 1 blocks, respectively, from the third region. Therefore, each memory channel is assigned 8 blocks for an equal distribution of the address space. Other embodiments with other non-power-of-two numbers of memory channels (e.g., 6, 7, 9, 10, 11, 12, 13, 14, 15) may utilize similar address interleaving schemes by adjusting the above-described parameters accordingly.

As a further example, an address interleaving scheme for twelve channels may utilize five bits for a first region and four bits for a second region. For the first region, eight of the twelve channels are assigned three blocks each. The other four channels are assigned two blocks each from the first region. For the second region, eight channels are assigned one block each. These eight channels correspond to the same eight channels that were assigned three blocks each from the first region. The other four channels are assigned two blocks each from the second region. Therefore, each of the twelve channels are assigned four blocks from the entire address space. Numerous such embodiments are possible and are contemplated.

Figure 5:
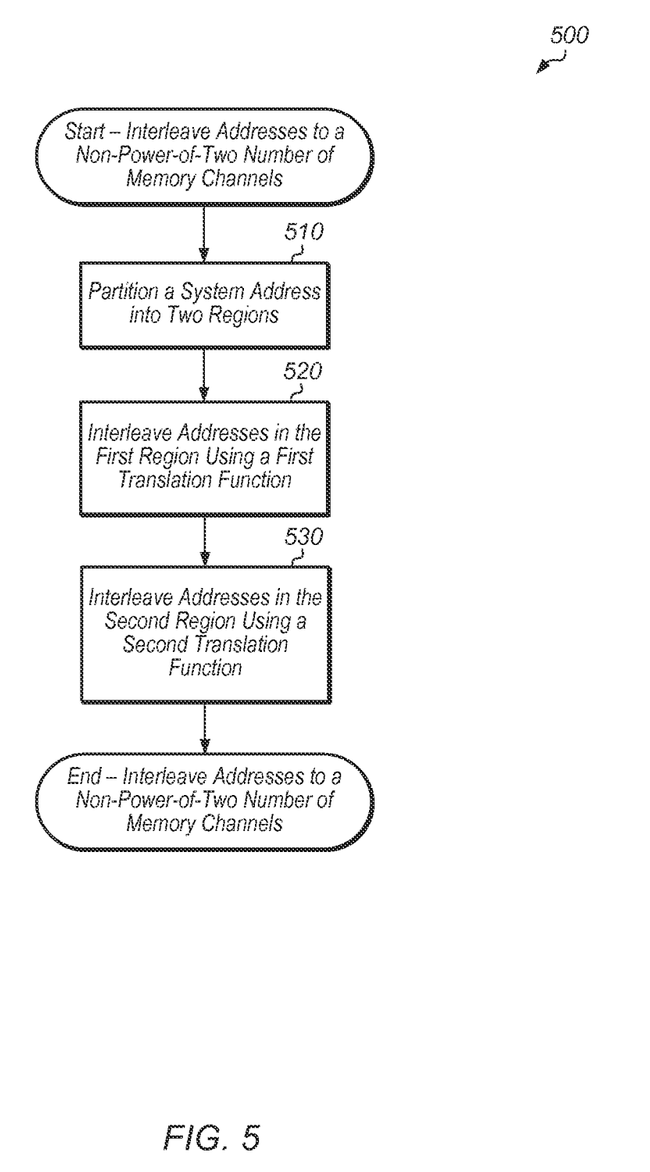
FIG. 5 is a generalized flow diagram illustrating one embodiment of a method for interleaving addresses to a non-power-of-two number of memory channels.

Turning now to FIG. 5, one embodiment of a method 500 for interleaving addresses to a non-power-of-two number of memory channels is shown. The components embodied in the processor 110 of FIG. 1 may generally operate in accordance with method 500. For purposes of discussion, the steps in this embodiment and subsequent embodiments of methods described later are shown in sequential order. However, some steps may occur in a different order than shown, some steps may be performed concurrently, some steps may be combined with other steps, and some steps may be omitted in another embodiment.

In one embodiment, a system address space is partitioned into two regions (block 510). In other embodiments, the system address space is partitioned into other numbers of regions. In this embodiment, the system address space is partitioned into two regions, with the size of each region based on the number of memory channels in the system. For example, in one embodiment, if there are 3 channels, then the system address space is partitioned into a first region that is $\frac{1}{3}^{rd}$ the size of the total address space and a second region that is $\frac{2}{3}^{rd}$ the size of the total address space. In another embodiment, if there are 5 channels, then the system address space is partitioned into a first region that is $\frac{1}{5}^{th}$ the size of the total address space and a second region that is $\frac{4}{5}^{th}$ the size of the total address space. In other embodiments, the system address space is partitioned in a similar fashion according to the number of memory channels in the system.

Next, addresses in the first region are interleaved using a first translation function (block 520). The first translation function may interleave addresses based on a first set of address bits. For example, if the first region is $\frac{1}{3}^{rd}$ the size of the total address space, and there are 3 memory channels in the system, then the first translation function may interleave addresses based on three address bits. In other embodiments, with other sizes of first regions and other numbers of memory channels, the first translation function may be based on other numbers of address bits.

Next, addresses in the second region are interleaved using a second translation function (block 530). The second translation function interleaves addresses based on a second set of address bits. The second set of address bits may be different than the first set of address bits used by the first translation function. For example, in one embodiment, if the second region is $\frac{2}{3}$rd the size of the total address space, and there are 3 memory channels in the system, then the second translation function may interleave addresses based on four address bits. By using the first and second translation functions for interleaving addresses in the first and second regions, respectively, the entire address space is evenly divided among the non-power-of-two number of memory channels. For embodiments with more than two regions, addresses in the additional regions may be interleaved in a similar fashion to the first and second regions as described above.

Figure 6:
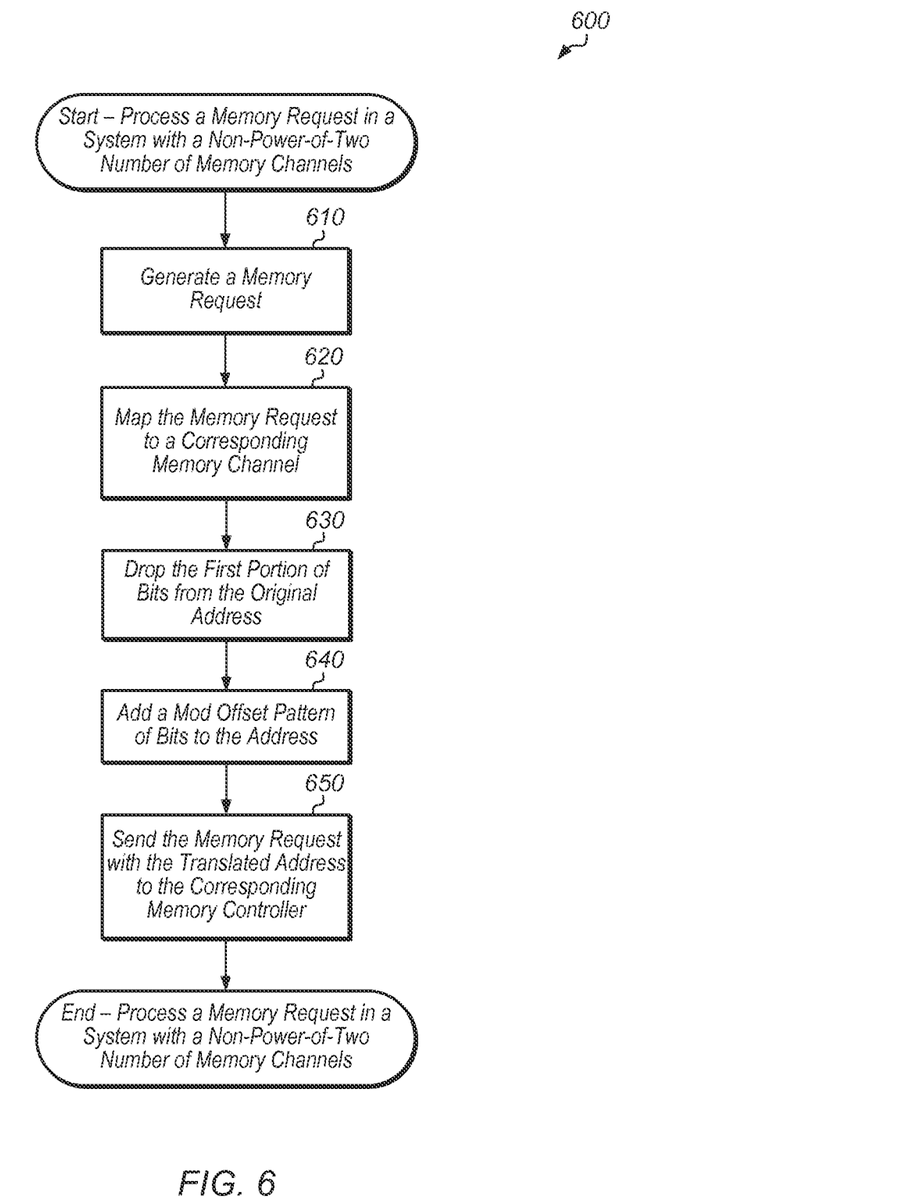
FIG. 6 is a generalized flow diagram illustrating one embodiment of a method for processing a memory request in a system with a non-power-of-two number of memory channels.

Turning now to FIG. 6, one embodiment of a method 600 for processing a memory request in a system with a non-power-of-two number of memory channels is shown. The components embodied in the computing system 100 of FIG. 1 may generally operate in accordance with method 600. For purposes of discussion, the steps in this embodiment and subsequent embodiments of methods described later are shown in sequential order. However, some steps may occur in a different order than shown, some steps may be performed concurrently, some steps may be combined with other steps, and some steps may be omitted in another embodiment.

In one embodiment, a memory request is generated by a processor core (block 610). The memory request is generated by any of a plurality of processor cores for read or write accesses to memory. For example, in one embodiment, a memory request is generated in response to detecting a cache miss for a given processor. Next, the address of the memory request is mapped to a corresponding memory channel (block 620).

In one embodiment, the system address map created earlier (as described in FIG. 5) is utilized to determine the corresponding memory channel. The system address map may be initialized through the execution of BIOS (Basic Input/Output System) code of the computing system in one embodiment. In one embodiment, multiple range registers are utilized to store the system address map. For example, each region of the system address space may have its own range register. The original address of the memory request may be used to determine which range register to utilize, and then the original address may be translated into a memory channel address by the respective range register. In one embodiment, a portion of the address bits of the original address may be utilized to determine the corresponding memory channel.

After block 620, the portion of the address bits used to translate the original address may be dropped from the original address (block 630). Then, a modulo offset pattern of bits is added to the address to prevent aliasing (block 640). In one embodiment, the mod offset bits are stored in a plurality of mod offset registers. Next, the memory request with the translated address (including the mod offset bits) is sent to the corresponding memory controller (block 650). It is noted that method 600 may be performed in parallel for any number of memory requests.

Figure 7:
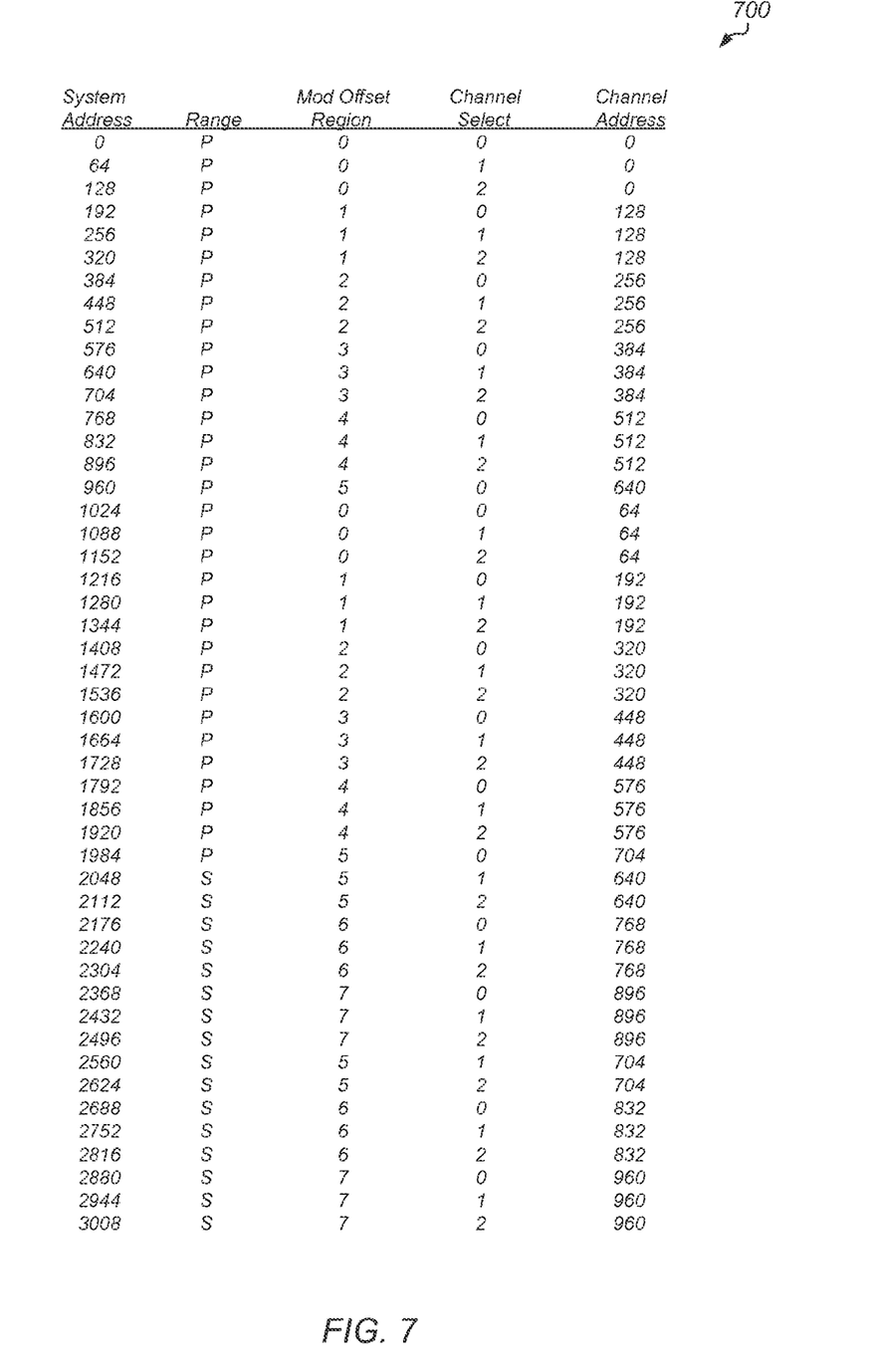
FIG. 7 is a table used for a nested interleaving address mapping scheme in accordance with one or more embodiments.

Turning now to FIG. 7, one embodiment of a table used for a nested interleaving address mapping scheme is shown. The table 700 is generated for a scenario with three memory channels and an address space partitioned into a primary region (with $\frac{2}{3}$ of the address space) and a secondary range (with $\frac{1}{3}$ of the address space). In this example, it is assumed that there is a 64 byte access size granularity. However, it is noted that in other embodiments, the access size granularity may vary.

In addition, there may be 8 different mod offset regions which are added to the translated address to prevent aliasing, with mod offset region 0 introducing an offset of 0 bytes, mod offset region 1 introducing an offset of 128 bytes, mod offset region 2 introducing an offset of 256 bytes, mod offset region 3 introducing an offset of 384 bytes, mod offset region 4 introducing an offset of 512 bytes, mod offset region 5 introducing an offset of 640 bytes, mod offset region 6 introducing an offset of 768 bytes, and mod offset region 7 introducing an offset of 896 bytes.

The primary (P) range register refers to a first range of the system address space, and the secondary (S) range register refers to a second range of the system address space. In one embodiment, the mapping for the primary range is stored in a first range register and the mapping for the secondary range is stored in a second range register. It is noted that in other embodiments, with other sizes of system address space and with other numbers of memory channels, the system address space is partitioned into more than two ranges.

The system address column of table 700 represents an address in the system address space. In this embodiment, system address blocks of 64 are mapped to alternating channels as shown in table 700. Within the primary range (from address 0 to 2047) of the system address space, four address bits are used to determine which channel a block of 64 is addressed to. As shown in table 700, within the primary range, 12 blocks are addressed to channel 0, 10 blocks are addressed to channel 1, and 10 blocks are addressed to channel 2.

Then, in the secondary range of the system address space, three address bits are used to determine the channel to which a given block of 64 is addressed. As shown in table 700, within the secondary range (from address 2048 to 3071), 4 blocks are addressed to channel 0, 6 blocks are addressed to channel 1, and 6 blocks are addressed to channel 2. Therefore, for the entire system address space, 16 blocks are addressed to each of channels 0, 1, and 2. In this way, the system address space has been mapped evenly to the three memory channels.

It is noted that the system address space may be mapped to other non-power-of-two numbers of memory channels in a similar fashion to the example illustrated by table 700.

The table shown in FIG. 7 illustrates the interleaved mapping from system address space to each of the three channels. It is noted that in other embodiments, the scheme is not limited to using the interleave decoding over address bits [9:6] for the primary range and address bits [8:6] for the secondary range as is shown in FIG. 7. Other address bit decodes may be chosen to suit the access sizes and patterns of the system.

Figure 8:
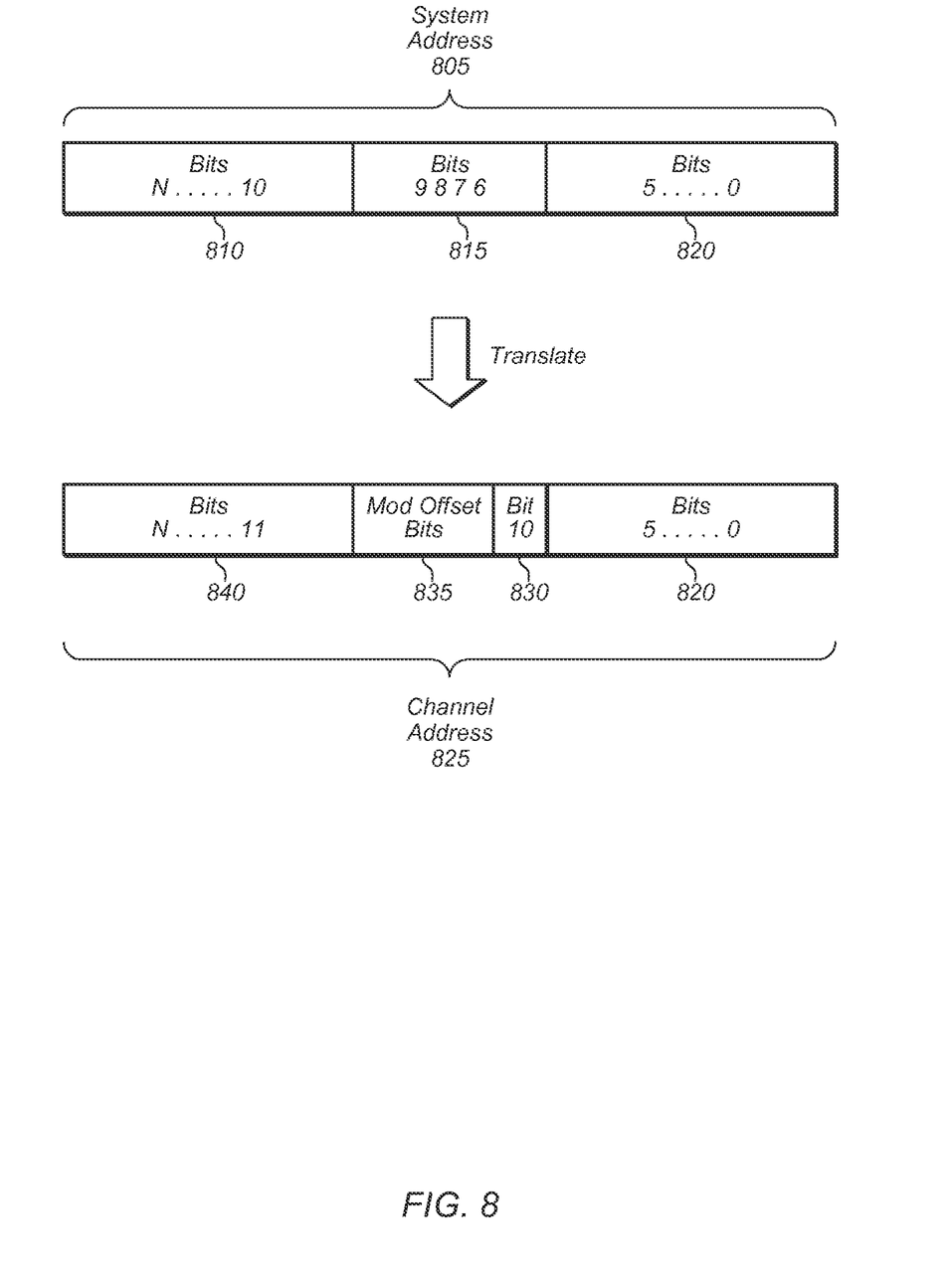
FIG. 8 illustrates one embodiment of a system address being translated into a channel address.

Turning now to FIG. 8, one embodiment of a system address being translated into a channel address is shown. System address 805 and channel address 825 are shown as being broken up into multiple sections in order to illustrate the techniques used to translate system address 805 into channel address 825. It is noted that the example shown in FIG. 8 is merely one example of a way to translate a system address into a channel address and should not be construed as limiting. Variations of the techniques described herein may be used to translate system addresses into channel addresses.

For the purposes of this discussion, system address 805 is shown as being composed of three sections of bits. Section 810 includes the upper address bits of system address 805, and these bits are labeled as bits N-10. The value of N may vary according to the embodiment. Section 810 may include any number of bits depending on the embodiment. Also, section 810 may not be included in some embodiments if the system address has 10 or fewer address bits. Section 815 of system address 805 includes 4 address bits, and these address bits are bits 9 through bits 6 of system address 805. This example corresponds to table 700 shown in FIG. 7 for the primary range, where four address bits are used to map system addresses to channels. For the secondary range of the address space shown in table 700 of FIG. 7, only three address bits are used to determine the mapping of system addresses to channels. Section 820 of system address 805 includes the lower address bits 5-0.

The translation of system address 805 into channel address 825 leaves section 820 unchanged, and so the lower level section 820 of channel address 825 retains the same value as the lower level section 820 of system address 805. Section 830 of channel address 825 is a single bit, and this bit is copied from bit 10 of section 810 of system address 805. Section 830 is actually bit 6 of channel address 825, but it is copied from bit 10 of system address 805, and so the label in section 830 is "Bit 10" to indicate this. Section 835 of channel address 825 holds bits 9-7 of channel address 825, and section 835 will take its value from the three mod offset bits. The three mod offset bits for a specific system address can be determined from the mod offset region column value in table 700. Section 840 includes the upper level address bits (Bits N-11) copied from section 810 of system address 805. It is noted that there may not be a section 840 of channel address 825 in some embodiments with small numbers of address bits.

It should be understood that the example shown in FIG. 8 is merely one example of a translation that may be performed and should not be construed as limiting. For example, in other embodiments, the number and location of bits from system address 805 that are used to determine the mapping to a specific memory channel may vary from embodiment to embodiment. In some embodiments, the bits used to determine the mapping may be non-contiguous.

Figure 9:
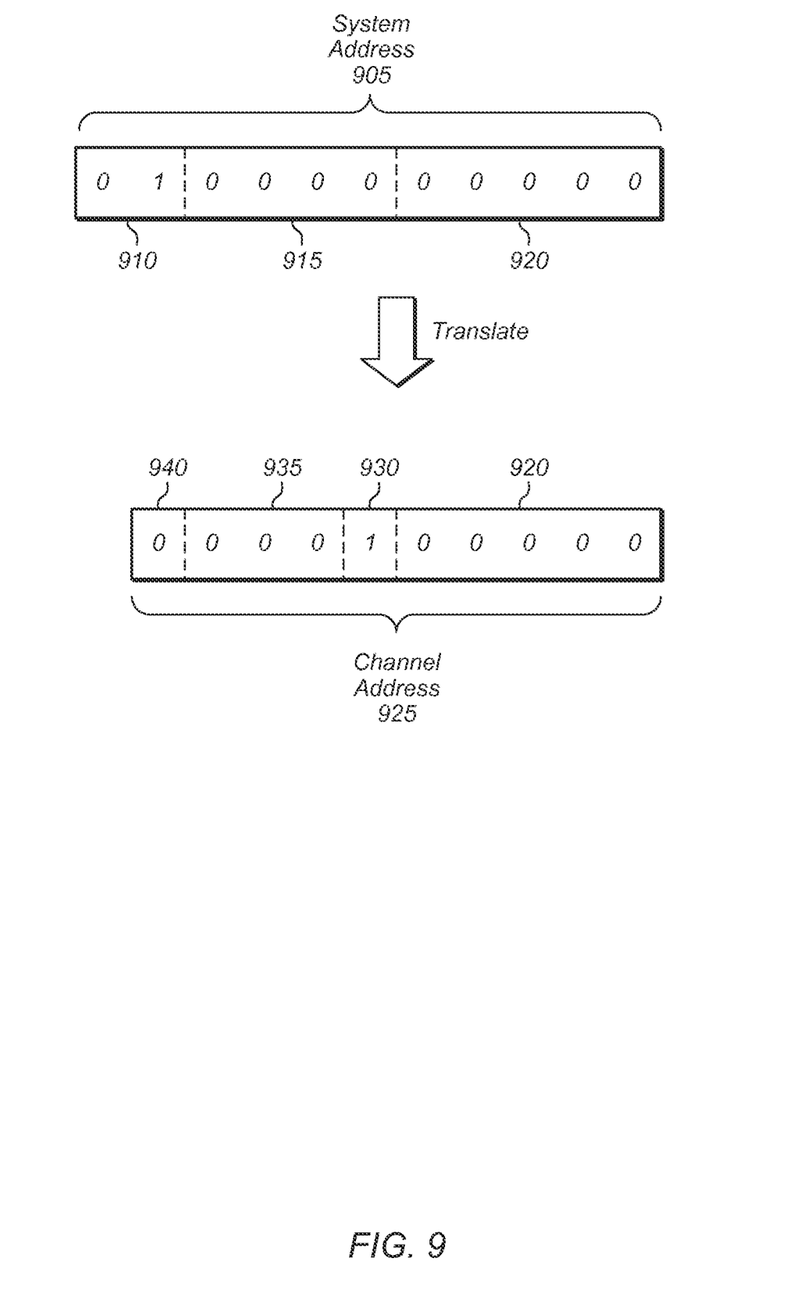
FIG. 9 illustrates one embodiment of a system address being translated into a channel address.

Referring now to FIG. 9, one embodiment of a system address being translated to a channel address is shown. FIG. 9 is a continuation of the example shown in FIG. 8 but using an actual system address value to illustrate the translation techniques described in FIG. 8. System address 905 has a decimal value of 1024 which can be calculated from the value of "1" in bit 10. As can be seen from the entry for system address 1024 in table 700 of FIG. 7, the mod offset region is 0, the channel select is 0, and the channel address is 64.

System address 905 includes section 910 (the upper level bits), section 915 (the bits used to determine the channel mapping), and section 920 (the lower level bits). To perform the translation of system address 905 into channel address 925, the same techniques shown in FIG. 8 may be used to perform the translation. Section 920 may remain unchanged in channel address 925. Section 930 may take the value of bit 10 of system address 905, which in this example is the value "1". Also, section 935 may be determined from the mod offset region of 0, which has a 3-bit value of "000". Finally, section 940 may take a value of "0" from the value of the upper-level bit from section 910 of system address 905. It is noted that in other embodiments, there may be additional upper level bits which may be copied from system address 905 to channel address 925.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool which may synthesize the description to produce a netlist comprising a list of gates from a synthesis library. The netlist comprises a set of gates which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   partitioning a system address space into at least a first portion and a second portion;
   translating first memory requests targeted to the first portion using a first set of memory request address bits such that the first memory requests are interleaved across N separate memory channels; and
   translating second memory requests targeted to the second portion using a second set of memory request address bits different from said first set of memory request address bits such that the second memory requests are interleaved across the N separate memory channels;
   wherein each memory channel is mapped to an equal amount of the address space;
   wherein memory requests targeted to the first portion are distributed across the N separate memory channels using a first number of bits, and memory requests targeted to the second portion are distributed across the N separate memory channels using a second number of bits different from the first number of bits.

2. The method as recited in claim 1, wherein the first and second portions of the address space comprise the entirety of the address space, and wherein the N separate memory channels are equal-sized.

3. The method as recited in claim 1, further comprising replacing bits of the translated and interleaved address of a given memory request with different bits when sending the given memory request to a corresponding memory channel.

4. The method as recited in claim 1, wherein N is a non-power-of-two positive integer and a size of the first portion is different than a size of the second portion.

5. The method as recited in claim 3, wherein the different bits comprise mod offset bits.

6. The method as recited in claim 1, wherein the first portion of the address space is mapped unevenly to the N separate memory channels.

7. A computing system comprising:
   N memory channels; and
   circuitry configured to:
   partition a system address space into at least a first region and a second region;
   apply a first translation function to memory requests targeted to the first region, wherein the first translation function interleaves addresses across the N memory channels; and
   apply a second translation function to memory requests targeted to the second region, wherein the second translation function interleaves addresses across the N memory channels, wherein the first and second translation functions evenly map the address space to the N memory channels, and wherein the second translation function is different than the first translation function;
   wherein memory requests targeted to the first region are distributed across the N memory channels using a first number of bits, and memory requests targeted to the second region are distributed across the N memory channels using a second number of bits different from the first number of bits.

8. The computing system as recited in claim 7, wherein the first region is two thirds of the address space, and wherein the second region is one third of the address space.

9. The computing system as recited in claim 8, wherein the first translation function is based on three address bits of a memory request, and wherein the second translation function is based on four address bits of a memory request.

10. The computing system as recited in claim 7, wherein N is a non-power-of-two positive integer.

11. The computing system as recited in claim 7, wherein the N memory channels are equal-sized.

12. The computing system as recited in claim 7, wherein the first region of the address space is mapped unevenly to the N memory channels.

13. A non-transitory computer readable storage medium storing program instructions, wherein the program instructions are executable to:
   partition a system address space into at least a first portion and a second portion;
   translate first memory requests targeted to the first portion using a first set of memory request address bits such that the first memory requests are interleaved across N separate memory channels; and
   translate second memory requests targeted to the second portion using a second set of memory request address bits different from the first set of memory request address bits such that the second memory requests are interleaved across N separate memory channels;
   wherein each memory channel is mapped to an equal amount of the address space;
   wherein memory requests targeted to the first portion are distributed across the N separate memory channels using a first number of bits, and memory requests targeted to the second portion are distributed across the N separate memory channels using a second number of bits different from the first number of bits.

14. The non-transitory computer readable storage medium as recited in claim 13, wherein the first region is two thirds of the address space, and wherein the second region is one third of the address space.

15. The non-transitory computer readable storage medium as recited in claim 14, wherein the first translation function is based on three address bits of a memory request, and wherein the second translation function is based on four address bits of the memory request.

16. The non-transitory computer readable storage medium as recited in claim 13, N is a non-power-of-two positive integer, a size of the first portion is different than a size of the second portion, and the N separate memory channels are equal-sized.

* * * * *